No. 641,028. Patented Jan. 9, 1900.
P. W. MEEHAN.
AIR PIPE FOR DRAIN TRAPS.
(Application filed June 22, 1899.)
(No Model.)

WITNESSES:
B. M. Simms
Chas. H. Luther Jr.

INVENTOR:
Patrick W. Meehan
by Joseph A. Miller & Co.
Attys.

UNITED STATES PATENT OFFICE.

PATRICK W. MEEHAN, OF PROVIDENCE, RHODE ISLAND, ASSIGNOR OF ONE-HALF TO EDWARD F. MEEHAN, OF NEW HAVEN, CONNECTICUT.

AIR-PIPE FOR DRAIN-TRAPS.

SPECIFICATION forming part of Letters Patent No. 641,028, dated January 9, 1900.

Application filed June 22, 1899. Serial No. 721,435. (No model.)

*To all whom it may concern:*

Be it known that I, PATRICK W. MEEHAN, of Providence, in the county of Providence and State of Rhode Island, have invented a new and useful Improvement in Air-Pipes for Drain-Traps; and I hereby declare that the following is a full, clear, and exact description of the same, reference being had to the accompanying drawings, forming part of this specification.

In the modern systems of plumbing for hotels, residences, and other buildings sinks, bath-tubs, water-closets, and other conveniences requiring to be drained are connected with a rising main terminating in a trap usually connected with a sewer. The rising main is usually extended to a point above the roof of the building, and the trap is connected with a pipe the end of which opens into the air at a point above the trap on the lower part of the building. By this arrangement the air enters the trap through this lower pipe and ascending through the rising main is discharged from the upper end of the rising main, thereby securing the ventilation of the trap and the rising main under normal conditions. When, however, washout or the modern siphon closets are used, the large quantity of water discharged into the rising main acts as a falling piston and drives the foul air and gases in the rising main and in the trap out through the lower air-inlet pipe and discharges the noxious air and gases into the street or other spaces adjacent to the building, creating an offensive nuisance.

The object of this invention is to provide a device which may be readily secured in the inlet end of the air-pipe, which while permitting the indraft of the air prevents the discharge of the foul gases from the same.

The invention consists in the peculiar and novel construction by which a sleeve supporting a clack or valve and preferably provided with a strainer is secured in the end of the air-pipe, as will be more fully set forth hereinafter.

Figure 1:
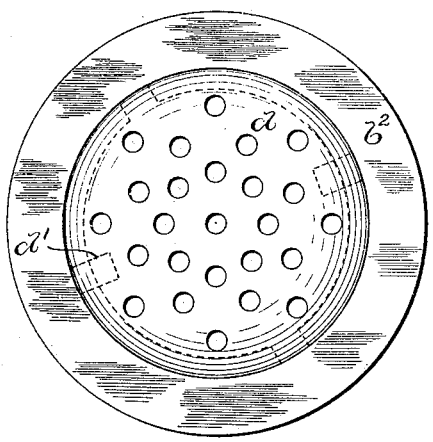
Figure 2:
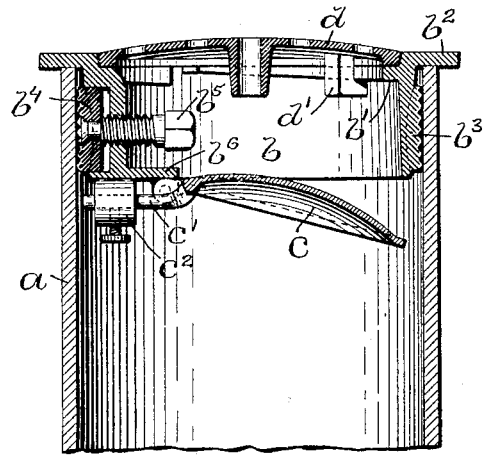
Figure 3:
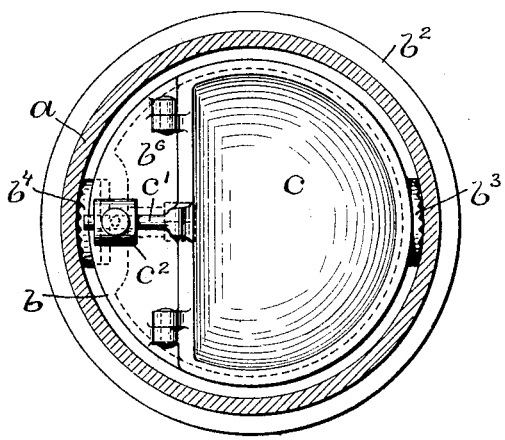
Figure 4:
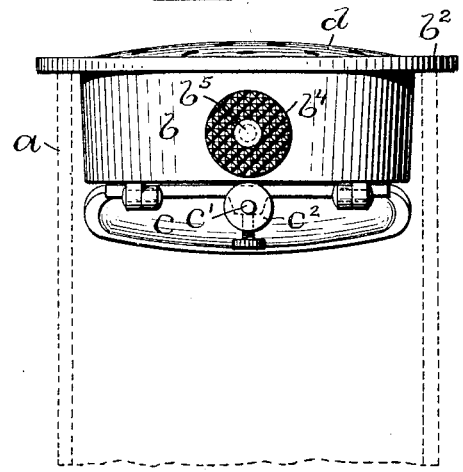
Figure 5:
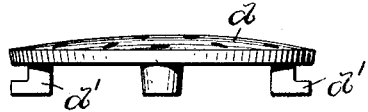
Figure 6:
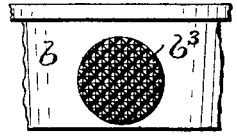

Figure 1 is an end view of the sleeve shown protected by the strainer. Fig. 2 is a sectional view of the end of the air-pipe, showing the sleeve provided with the clack and the strainer secured in the pipe. Fig. 3 is a transverse sectional view of the air-pipe, showing the clack or valve. Fig. 4 is a side view of the sleeve, the air-pipe being indicated in broken lines. Fig. 5 is a side view of the detachable strainer; and Fig. 6 is a view of part of the sleeve, showing the roughened clamping-plate.

Similar letters of reference indicate corresponding parts in all the figures.

In the drawings, $a$ indicates the end of the air-pipe forming the normal inlet for the air to the trap; $b$, the sleeve of less diameter than the internal diameter of the air-pipe, and $b'$ an inwardly-projecting flange slotted at two or more places for the insertion of the posts on the strainer; $b^2$, an outwardly-projecting flange bearing on the end of the air-pipe, and $b^3$ a projecting roughened clamping-surface on the outside surface of the sleeve $b$. The clamping-disk $b^4$, having a roughened surface, is secured to and operated by the screw $b^5$ in screw-thread engagement with the wall of the sleeve $b$. The clamping-disk $b^4$ is preferably placed in a recess in the wall of the sleeve $b$, as is shown in Fig. 2, where the clamping-surface $b^3$ is shown opposite the clamping-disk $b^4$; but two clamping-surfaces $b^3$ may be formed on the sleeve, so located that they, with the screw $b^5$, form three points on the peripheral surface of the sleeve $b$, preferably equidistant apart. Across a portion of the inward opening of the sleeve $b$ the flange $b^6$ extends, to which the clack $c$ is pivotally connected, as shown in Fig. 3. The clack $c$ is provided with the stem $c'$, on which the counterweight $c^2$ is adjustably secured. The clack $c$ is preferably made of concavo-convex sectional form and of light metal, preferably aluminium. The perforated strainer $d$ is provided with the posts $d'$, which enter the slots in the flange $b'$, so that a partial rotation of the strainer secures the same.

With this device secured to the inlet of the air-pipe the air enters the pipe in the normal condition to secure the ventilation of the trap and the rising main, but the nearly-counterbalanced clack will close and prevent the discharge of foul air or gases when falling water drives the foul air down the rising main into the air-pipe.

The device may be readily secured to the end of any existing air-pipe, the strainer preventing the entrance of dirt or other solid matter.

Having thus described my invention, I claim as new and desire to secure by Letters Patent—

1. In an air-pipe for drain-traps, the combination with the end of the air-pipe, of the sleeve $b$, the flange $b'$, the strainer $d$ provided with the posts $d'$, the flange $b^6$ extending across a portion of the inner end of the sleeve $b$, the clack $c$ pivotally secured to the flange $b^6$, the stem $c'$ extending from the clack, the counterweight $c^2$, and means for securing the sleeve in the pipe, substantially as described.

2. In a device of the nature described, the combination with the end of the air-pipe, of the sleeve $b$, the flange $b^2$ extending over the end of the air-pipe, the flange $b^6$ extending across a portion of the inner end of the sleeve $b$, the clack $c$ pivotally secured to the flange $b^6$, the stem $c'$ extending from the clack, the counterweight $c^2$, and means for securing the sleeve in the pipe, as described.

3. In an air-pipe for drain-traps, the combination with the end of the air-pipe, of the sleeve $b$, the flange $b^2$ extending over the end of the air-pipe, the inwardly-projecting flange $b'$, the strainer $d$ provided with the posts $d'$, the flange $b^6$ extending across a portion of the inner end of the sleeve $b$, the clack $c$ pivotally secured to the flange $b^6$, the stem $c'$ extending from the clack, the counterweight $c^2$, the clamping-surface $b^3$, the clamping-disk $b^4$ secured to the screw $b^5$, and the screw $b^5$ for securing the sleeve in the pipe, as described.

In witness whereof I have hereunto set my hand.

PATRICK W. MEEHAN.

Witnesses:
J. A. MILLER, Jr.,
B. M. SIMMS.